(12) United States Patent
Spadaccini et al.

(10) Patent No.: US 6,315,815 B1
(45) Date of Patent: Nov. 13, 2001

(54) MEMBRANE BASED FUEL DEOXYGENATOR

(75) Inventors: Louis J. Spadaccini, Manchester; Richard A. Meinzer; He Huang, both of Glastonbury, all of CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/464,112

(22) Filed: Dec. 16, 1999

(51) Int. Cl.⁷ .............................. B01D 19/00; B01D 53/22
(52) U.S. Cl. ............... 95/46; 95/54; 96/6; 96/8; 96/11
(58) Field of Search .................. 95/45, 46, 54; 96/4, 6–8, 10, 12, 13

(56) References Cited

U.S. PATENT DOCUMENTS

| | | | |
|---|---|---|---|
| 4,268,279 | * 5/1981 | Shindo et al. ............................ | 95/46 |
| 4,539,113 | * 9/1985 | Tomita et al. ......................... | 96/6 X |
| 4,729,773 | * 3/1988 | Shirato et al. ............................. | 96/6 |
| 4,740,219 | * 4/1988 | Kulprathipanja et al. ........... | 95/54 X |
| 4,869,732 | * 9/1989 | Kalfoglou .............................. | 95/46 |
| 5,078,755 | * 1/1992 | Tozawa et al. ......................... | 95/46 |
| 5,695,545 | * 12/1997 | Cho et al. ............................... | 95/46 |
| 5,723,035 | * 3/1998 | Mazanec et al. ..................... | 96/6 X |
| 5,762,684 | * 6/1998 | Hayashi et al. ...................... | 95/46 X |
| 5,830,261 | * 11/1998 | Hamasaki et al. ................... | 95/46 X |
| 5,888,275 | * 3/1999 | Hamasaki et al. ................... | 95/46 X |
| 5,968,366 | * 10/1999 | Deckman et al. .................... | 95/45 X |
| 6,168,648 | * 1/2001 | Ootani et al. ............................ | 95/46 |

FOREIGN PATENT DOCUMENTS

| | | | |
|---|---|---|---|
| 4006465A | * 9/1991 | (DE) ........................................ | 96/6 |
| 0385947A | * 9/1990 | (EP) ...................................... | 95/45 |
| 03-213103A | * 9/1991 | (JP) ........................................ | 95/46 |
| 04-290502A | * 10/1992 | (JP) ........................................ | 95/46 |
| 04-349902A | * 12/1992 | (JP) ........................................ | 95/46 |
| 0668875A | * 6/1979 | (RU) ...................................... | 96/6 |
| 1646572A | * 5/1991 | (RU) ...................................... | 96/6 |

OTHER PUBLICATIONS

S. Darah, "Jet Fuel Deoxigenation", Geo Centers, Inc., (Oct. 1988), Interim Report under Contract AFWAL–TR–88–2081, 28 pages.

J.D. Seader et al., "Separation Process Principles", John Wiley & Sons, Inc., (Dec. 1997), pp. 720–726.

* cited by examiner

*Primary Examiner*—Robert H. Spitzer (57) ABSTRACT

Apparatus and method for the deoxygenation of liquid fuel in the fuel system of an energy conversion device, such as an aircraft gas turbine engine. A membrane filter is disposed in the fuel system and is selected to remove oxygen from the fuel, typically a hydrocarbon, while excluding the fuel. The membrane filter may be permeable or porous to the oxygen and, in a preferred embodiment, is of polytetraflouroethylene. Fuel with dissolved oxygen (typically from air) is flowed in contact with one surface of the membrane filter, and removed oxygen is collected from the opposite surface of the filter. The difference in the partial pressure of oxygen across the membrane filter may be controlled to regulate the driving force for moving oxygen through the membrane. Reduction of the oxygen concentration in jet fuel to less than 10 ppm at liquid space velocities of 100/hr and greater are attained.

22 Claims, 8 Drawing Sheets

MEMBRANE BASED FUEL DEOXYGENATOR

TECHNICAL FIELD

This invention relates to the removal of oxygen from fuels and more particularly, to the removal of dissolved oxygen from liquid hydrocarbon fuels.

BACKGROUND ART

Because of its relative abundance in the air of the atmosphere, relatively large quantities of oxygen, as well as nitrogen and other gases, readily dissolve into various liquid media. The presence of dissolved oxygen, in particular, in some liquids, such as hydrocarbon fuels, may be objectionable because it supports oxidation reactions that yield undesirable by-products.

Figure 1:
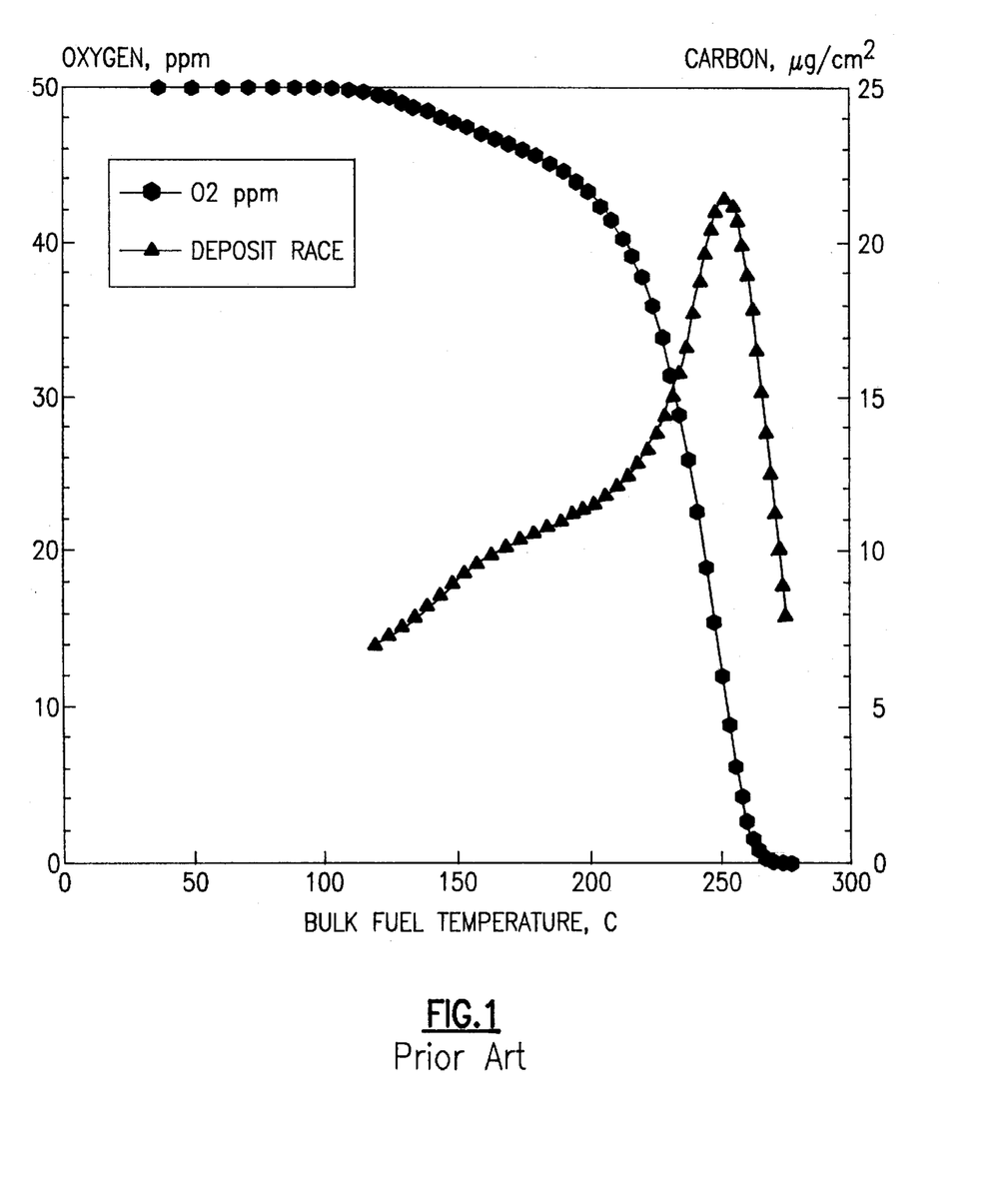
FIG. 1 graphically depicts the corresponding consumption of oxygen and formation of deposits as fuel temperature increases.

For instance, jet fuel in aircraft may be used as a coolant for various systems in the aircraft. When air-saturated fuel is heated to temperatures above about 250° F. –300° F., the dissolved oxygen reacts to form free radical species (coke precursors) which initiate and propagate other autoxidation reactions leading to the formation of objectionable deposits, called "coke" or "coking". This relationship is illustrated in FIG. 1 for jet fuel, where it is seen that as temperature increases beyond about 150° C. (300° F.), the process of autoxidation consumes oxygen and forms carbonaceous deposits. The temperature at which autoxidation begins differs for different fuels. These autoxidation reactions may also occur in jet fuel as it is heated immediately prior to injection for combustion, such that deposits may occur in the injectors. In any event, the formation of such deposits impairs the normal functioning of a fuel delivery system, either with respect to an intended heat exchange function or the efficient injection of fuel.

Still further, such autoxidation reactions may create objectionable deposits by oxygen-laden hydrocarbon fuels when used in other energy conversion devices and systems, as for instance fuel cells.

Figure 2:
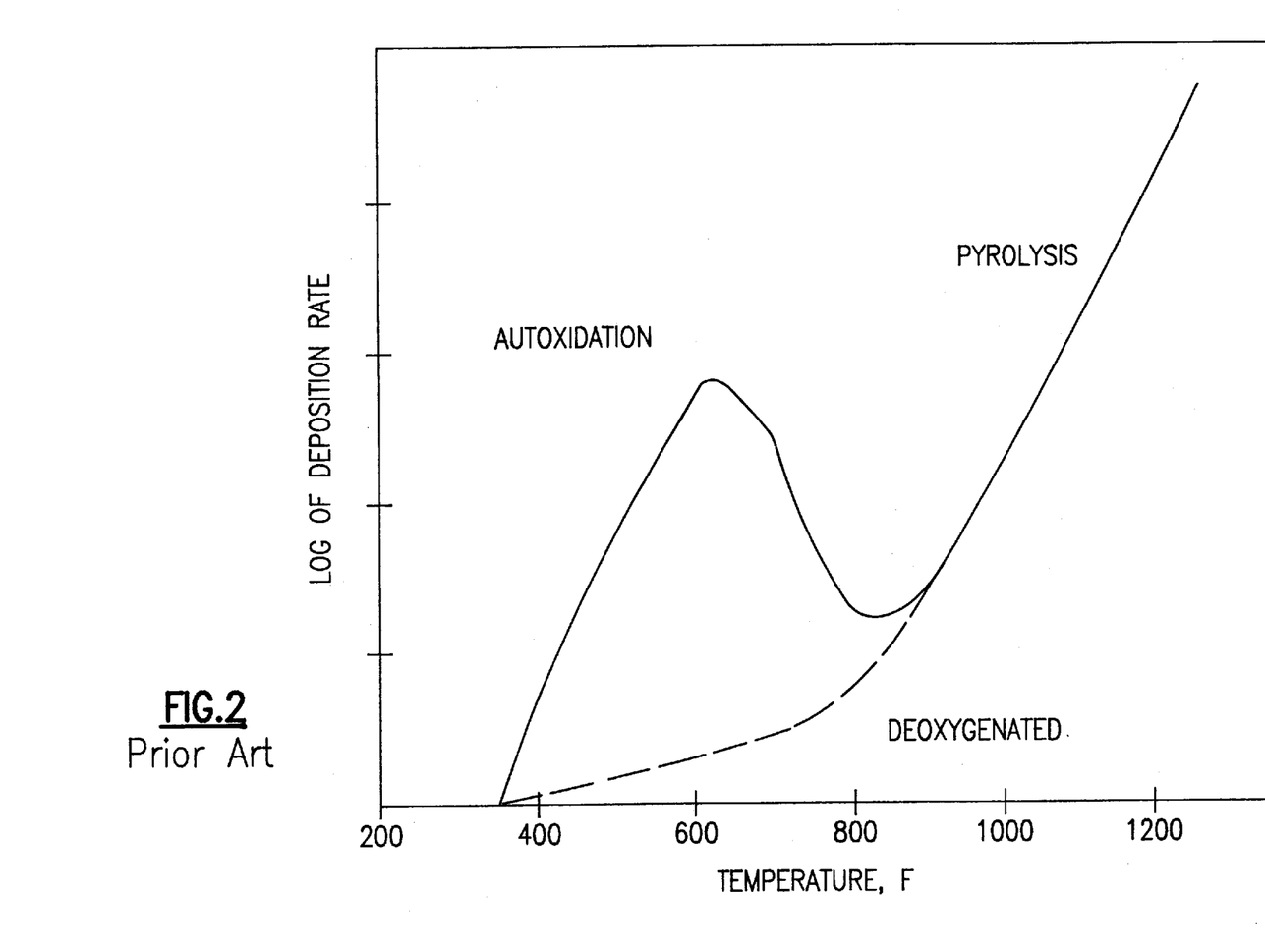
FIG. 2 graphically depicts the rate at which deposits occur as a function of temperature, both for fuel containing oxygen and for deoxygenated fuel.

Referring to FIG. 2, the above mentioned reaction path is dominant at temperatures up to about 700° F., but becomes unimportant when the concentration of dissolved oxygen is reduced from its saturated value (about 70 ppm) to very low levels (5 ppm or less). Indeed, reduction of the dissolved oxygen to levels less than 20 ppm and particularly less than 10 ppm, yield dramatic reductions in the formation of deposits by autoxidation reactions. Since pyrolysis occurs at higher temperatures than autoxidation, reducing the oxygen concentration allows the fuel to be heated to a higher temperature before thermal decomposition occurs.

Previous methods of reducing the oxygen content of fuels are discussed in a report, dated Oct. 1988, by S. Darrah entitled "Jet Fuel Deoxygenation" under Air Force Contract F33615-84-C-2412. These methods included the use of chemical getters (reducing agents), molecular sieve adsorbents, and nitrogen sparging. The report discussed each in some detail, and expressed a preference for nitrogen sparging for large quantities of fuel. However, each of these methods has proven impractical at least for aircraft applications because they are costly, heavy and bulky, and/or may even be dangerous. Chemical getters involve the use of active metals, which pose containment and disposal issues. Molecular sieves do not pose reactivity limitations, but present issues of volume and weight, particularly in aircraft. Nitrogen sparging may be unfeasible because of the volume of nitrogen required during a mission.

What is needed is a method and/or means for deoxygenating hydrocarbon fuel in a cost effective, size efficient, weight efficient, and/or safe manner. The fuel deoxygenation technique should be capable of on-line operation, i.e., continuous use at flow rates which are consistent with the rate of fuel use in the intended energy conversion device, such as an aircraft jet engine or the like. Moreover, the deoxygenation technique should be capable of removing oxygen to a level at least below that at which significant coking would otherwise occur. As used herein, "significant coking" is the minimum amount of coking which, if it occurred in the interval between normal intended maintenance events for such portions of the fuel system, would be viewed as objectionable. Such coking occurs most readily in the portions of the fuel system having high temperatures and/or constricted flow paths.

DISCLOSURE OF INVENTION

The present invention relates to the deoxygenation of liquid fuel in the fuel system of an energy conversion device. More particularly, the present invention relates to a method and to a deoxygenator apparatus for removing dissolved oxygen from the liquid fuel in a cost effective, weight efficient and/or safe manner.

According to the present invention, there is provided a fuel deoxygenator having a membrane filter disposed in a liquid fuel system. The membrane filter is of such material, and is positioned, structured, and operated for liquid fuel to flow into contact with a fuel-side surface of the filter such that oxygen is removed from the fuel to a level at least below that at which significant coking occurs. The membrane filter passes oxygen molecules and excludes the liquid fuel sufficiently to remove oxygen from the fuel to a level at least below 20 ppm, preferably below about 10 ppm at a liquid space velocity $$\left( SV = \frac{\text{volume flowrate}}{\text{reactor volume}} = \frac{1}{\text{residence time}} \right)$$

of at least 100/hr., and more preferably, to a level of about 5 ppm.

The membrane filter may be a permeable membrane which operates by a solution-diffusion mechanism, such as silicone-rubber; a porous membrane that operates by allowing dissolved oxygen to diffuse through angstrom sized pores, such as a layer of zeolite particles; or, preferably, is from the family of polytetraflouroethylene type compounds. The membrane filter may be disposed on the surface of a porous substrate for support.

The fuel system includes a deoxygenation chamber, with the membrane filter so structured and positioned therein as to provide a fuel region and a removed oxygen region on opposite sides of the filter. Means may be provided for regulating the partial pressures of oxygen across the membrane to regulate the driving force for moving oxygen through the membrane. In the interest of safety, any possible fuel leaks through the membrane filter are isolated from the environment by returning fuel and/or gases in the removed oxygen region to a fuel tank.

The foregoing features and advantages of the present invention will become more apparent in light of the following detailed description of exemplary embodiments thereof as illustrated in the accompanying drawings.

BEST MODE FOR CARRYING OUT THE INVENTION

As described above with reference to FIGS. 1 and 2, the effects of the autoxidation reaction on fuel containing a substantial amount of dissolved oxygen, as the fuel temperature increases between 300° and 700° F., is to produce quantities of objectionable carbonaceous deposits, or coking. Moreover, FIG. 2 reveals generally the extent to which the problem can be ameliorated by deoxygenating the fuel before subjecting it to operation in that temperature range.

The inventors herein were aware of the limitations to the above mentioned techniques for deoxygenating hydrocarbon fuels, particularly for use in aircraft. They have discovered that membrane filters of certain materials overcome some of the prior limitations, particularly when structured and operated in preferred manners. There have been recent uses of similar membrane filter materials to remove oxygen from water where pure supply water is required, as in the manufacture of semiconductors, but the inventors are not aware of any suggestion that such membranes may be used for deoxygenating hydrocarbon fuels to reduce coking in energy conversion devices, and particularly for aircraft.

Generally speaking, the inventors have found materials in two broad classes of membrane filters to provide improved results. Those classes include porous membranes, which allow dissolved oxygen (and other gases) to diffuse through angstrom-size holes but exclude the larger fuel molecules, and permeable membranes which use a solution-diffusion mechanism to dissolve the oxygen (and the other gases) and allow it (or them) to diffuse through the membrane, while excluding the fuel. The family of polytetraflouroethylene type compounds (PTFE), often identified under the trademark "Teflon" registered to E. I. DuPont de Nemours of Wilmington, Del., have proven to provide the best results for fuel deoxygenation. The PTFE material is believed to use a solution-diffusion mechanism, but may also operate via its porosity, depending on formulation and structure. A further example of a porous membrane material is a thin layer of 50 Angstrom porous alumina ceramic, or zeolite. A further example of a permeable membrane is a thin layer of silicone rubber.

Figures 3, 4:
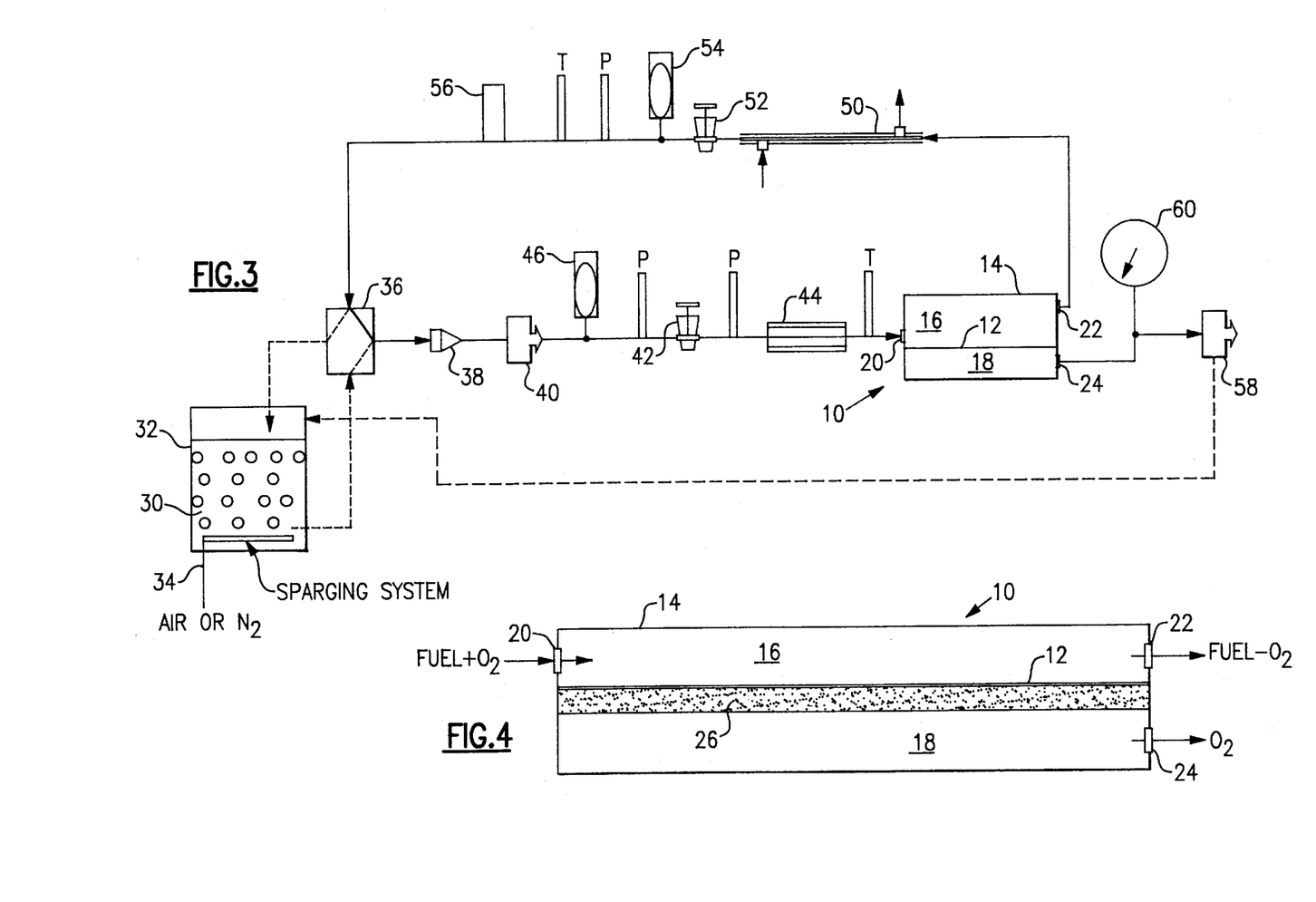
FIG. 3 is a simplified schematic of a test system for measuring the oxygen removal rate from jet fuel using a membrane filter deoxygenator in accordance with the invention.
FIG. 4 is a simplified depiction of a membrane filter for a fuel deoxygenator in accordance with the invention.

Referring to FIG. 3, there is illustrated a schematic of the test system used to measure the oxygen removal rate from jet fuel, shown using a membrane filter deoxygenator 10 of the invention. As depicted functionally in greater detail in FIG. 4, the deoxygenator 10 includes a membrane filter 12 supported within a housing or deoxygenation chamber 14. The membrane filter 12 is typically so structured and positioned within the chamber 14 as to divide the chamber into a fuel region 16 and a removed oxygen region 18. The chamber 14 includes a fuel inlet 20 for admitting fuel which may contain dissolved oxygen to the fuel region 16, a fuel outlet 22 for discharging fuel from the fuel region 16 which normally has been deoxygenated by flowing over the fuel-contacting surface of the membrane filter 12, and an oxygen outlet 24 for discharging at least oxygen from the removed oxygen region 18. The membrane filter 12 is typically, though not necessarily, supported on and by a substrate 26 of suitably porous material, as for example, sintered steel. As will be described below, control of the fuel temperature or of the difference in partial pressures of oxygen on opposite sides of the membrane filter 12 serves to regulate the rate at which oxygen moves through the membrane. At or near the fuel inlet 20 there may optionally be included structure (not shown) for inducing/increasing turbulence in the fuel flow to enhance mass transfer, as will be described.

Returning to a brief description and discussion of the salient features of the test system of FIG. 3, JP-8 jet fuel 30 is stored in a tank or reservoir 32. The fuel 30, for reference purposes, typically is saturated with dissolved air to establish an oxygen maximum and, oppositely, is purged by nitrogen to displace oxygen and establish an oxygen minimum. The air and/or nitrogen are introduced by a sparging system 34. The dissolved oxygen is representative of normal operation in which the amount of such oxygen may be near a saturation level of 70 ppm. Alternatively, nitrogen may be introduced to displace the oxygen to obtain reference data for calibration.

Fuel 30 is delivered from reservoir 32 to the fuel inlet 20 of membrane filter deoxygenator 10 via a valve 36, filter 38, pump 40, pressure regulator 42, and heater 44. The pump 40 supplies the requisite driving force/pressure to move the fuel. The pressure regulator 42 allows adjustment of pressure for test purposes. Pressure sensors P sense and monitor the pressure. An accumulator 46 accommodates surges. The filter assures a particle-free fuel flow into the membrane filter deoxygenator 10. The heater 44 simulates the heat input the fuel 30 could receive in the course of its use, often as a coolant, in a conventional operating system. A temperature sensor T senses and monitors the temperature of the fuel just prior to its admission to the deoxygenator 10.

Deoxygenated fuel 30 exits the deoxygenator 10 at fuel outlet 22 and, in the test apparatus, is recirculated, either directly via valve 36 or more usually through return to the reservoir 32. In either event, that return path from the deoxygenator to the valve 36 includes a cooler 50 and a pressure regulator 52. The cooler 50 returns the fuel 30 to a predetermined reference temperature, e.g., ambient. The pressure regulator 52 regulates fuel pressure in the return path to a reference pressure, e.g., ambient. An accumulator 54 accommodates pressure surges, and the temperature and pressure of the deoxygenated and possibly cooled fuel 30 is monitored by pressure and temperature sensors P and T, respectively. Importantly, the oxygen level in the deoxygenated fuel 30 at the reference condition is monitored by an oxygen sensor 56.

A vacuum pump 58 aids in regulating the partial pressure of oxygen in the removed oxygen region 18, thus regulating the difference in partial pressures of oxygen across membrane filter 12. Additionally, the vacuum pump 58 assists oxygen removed from the fuel 30 in the deoxygenator 10 to exit the deoxygenator via outlet 24. A vacuum gauge 60 monitors the level of pressure/vacuum existing in the removed oxygen region 18 of the deoxygenator. In the test system, the surplus oxygen may be vented to the atmosphere; however, it may be preferable to return the oxygen to fuel reservoir 32, as would be done for reasons of safety in an actual system and is shown in broken line in FIG. 3. The concern for safety arises from the possible occurrence of any liquid/vapor fuel that may leak past the membrane filter 12.

Using the test system of FIG. 3, various parameters associated with the design and operation of deoxygenator 10 were varied, and the results measured. The significant results are displayed in FIGS. 5–8, and a discussion of their significance follows. In each instance, the graphs plot dissolved oxygen concentration versus the residence time of the fuel 30 in contact with the surface of membrane filter 12. The several constants throughout the tests viewed in FIGS. 5–8 are the use of JP-8 jet fuel as the liquid hydrocarbon fuel under consideration, the use of PTFE as the material of the membrane filter 12, and a constant surface area to volume ratio (S/V: 55 cm$^{-1}$). The S/V ratio is the surface area (S) of membrane 12 relative to the volume (V) of the fuel region 16, and favors an arrangement having only a thin layer of fuel passing over a relatively large membrane area. Unless stated otherwise, the thickness of the PTFE membrane was 1 mil. Although the other classes of materials described earlier as providing the advantages of the invention were also evaluated in similar ways and yielded similar results, those results were collectively of lesser positive significance than for the use of PTFE.

Figure 5:
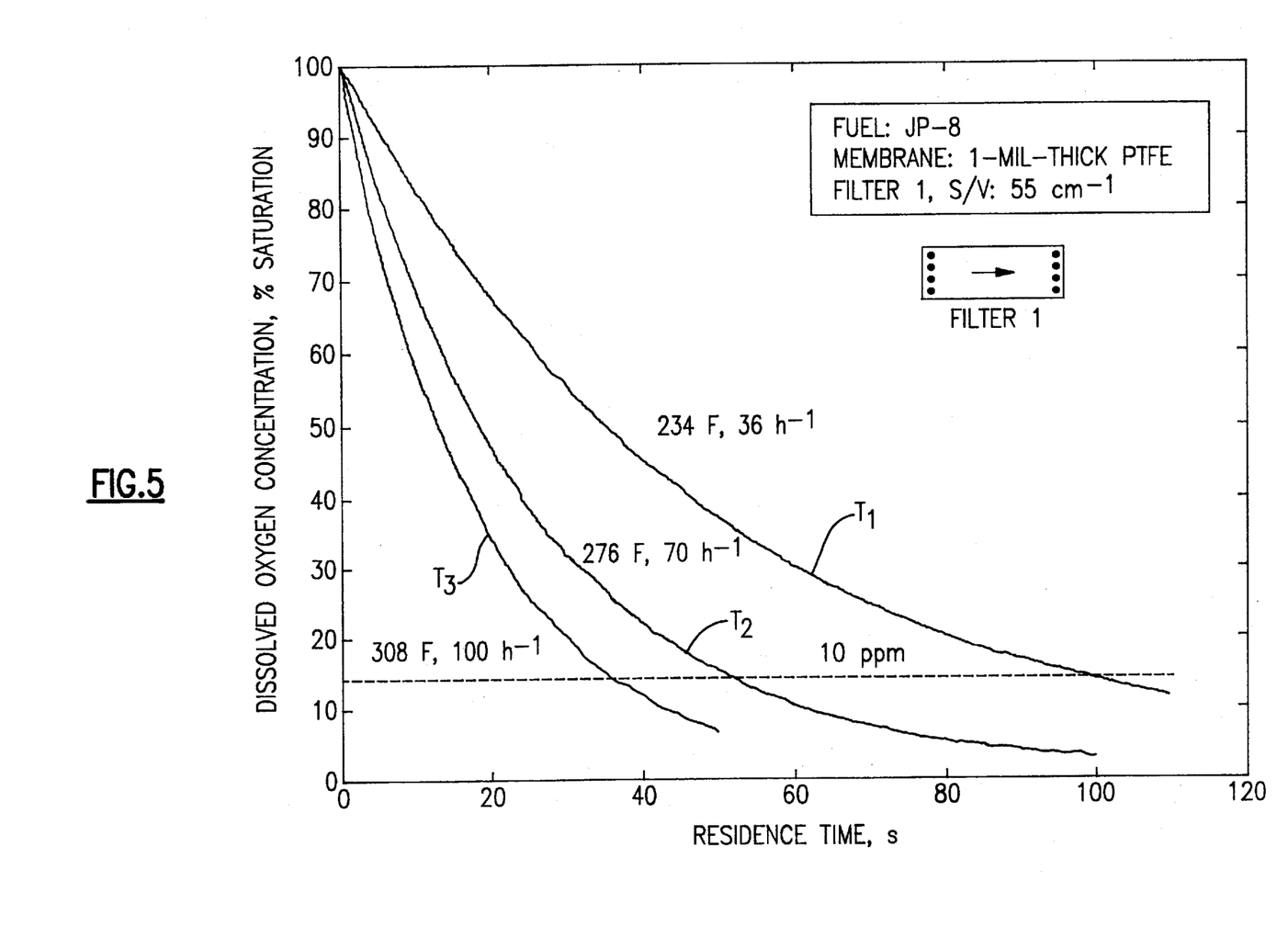
FIG. 5 graphically depicts the influence of temperature on the rate of fuel deoxygenation for a particular membrane filter material in accordance with the invention.

The influence of temperature is depicted in FIG. 5 for a 1-mil-thick membrane 12. In the instance of oxygenated fuel 30 entering the deoxygenator 10 at a first temperature, $T_1$, of 234° F., the initial dissolved oxygen of 70 ppm (100% saturation) was reduced to and below a target level of 10 ppm (about 14% saturation) in about 100 seconds. Fuel at a second temperature, $T_2$, of 276° F., was deoxygenated to the loppm level in about 50 seconds. Fuel at a third temperature, $T_3$, of 308° F., was deoxygenated to the 10 ppm level in less than 40 seconds. These rates of deoxygenation correspond to space velocities $$SV = \frac{\text{volume flowrate}}{\text{reactor volume}} = \frac{1}{\text{residence time}}$$

of approximately 36 h$^{-1}$, 70 h$^{-1}$, and 100 h$^{-1}$, respectively. Thus, greater space velocities (shorter residence times) can be obtained when the fuel temperature is increased, thereby increasing the partial pressure of oxygen in the fuel and the permeability of the membrane.

Figure 6:
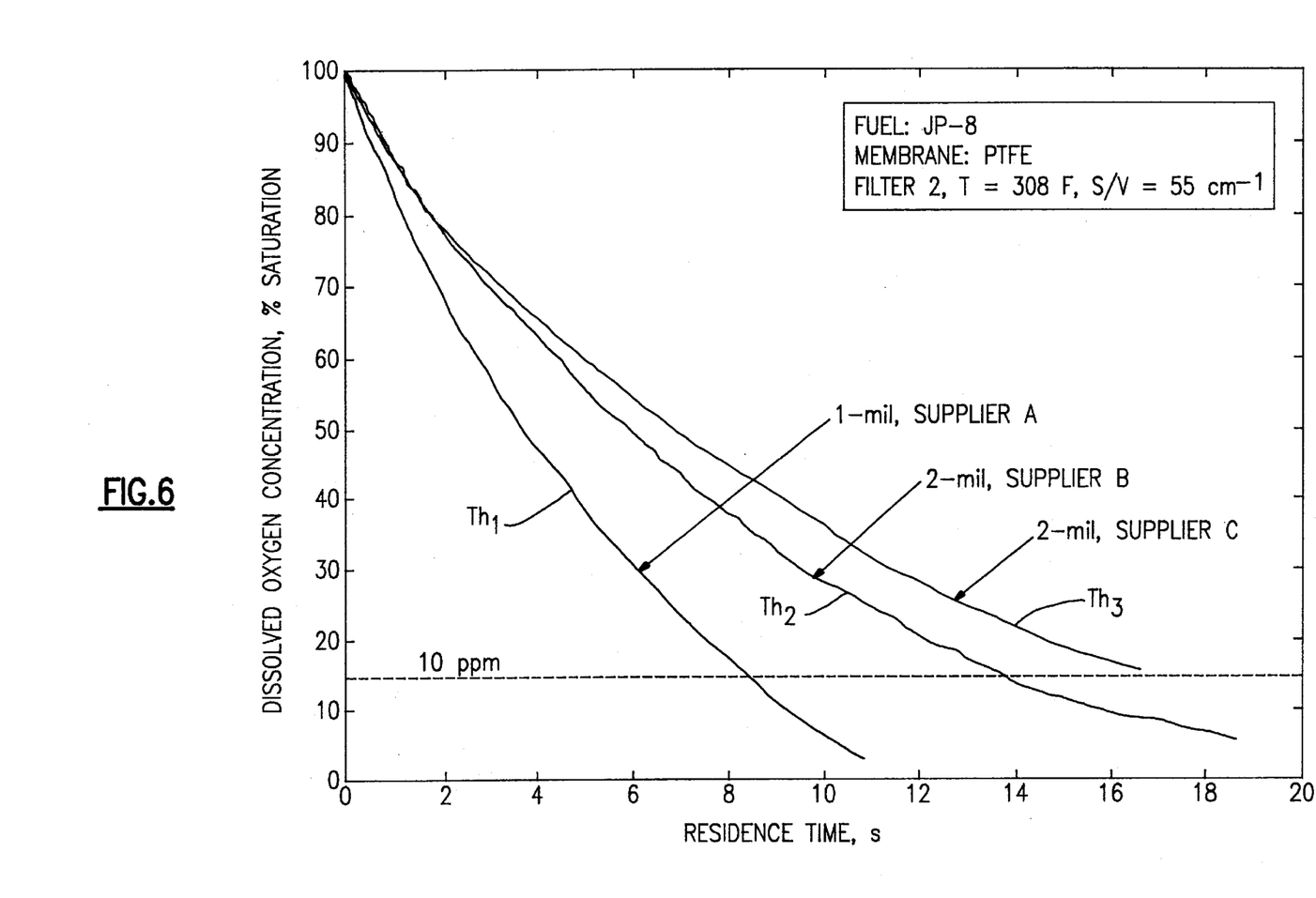
FIG. 6 graphically depicts the effect of membrane thickness on the rate of fuel deoxygenation for the membrane material of FIG. 5.

The influence of membrane thickness is depicted in FIG. 6, where the fuel temperature is maintained at 308° F. A first PTFE membrane 12 is 1-mil thick, and results in trace Th$_1$, which indicates deoxygenation to the 10 ppm level in less than 9 seconds. A second PTFE membrane 12 is 2-mil-thick, and results in trace Th$_2$, which indicates deoxygenation to the 10 ppm level in about 14 seconds. A third PTFE membrane 12 is also 2-mil-thick, but is made by a different manufacturer than made the second membrane. That third membrane results in trace Th$_3$, which indicates that deoxygenation to the 10 ppm level requires approximately 17 seconds. This test emphasizes the desirability of the PTFE membrane filter being relatively thin, i.e., less than about 2-mils and preferably, 1-mil.

Figure 7:
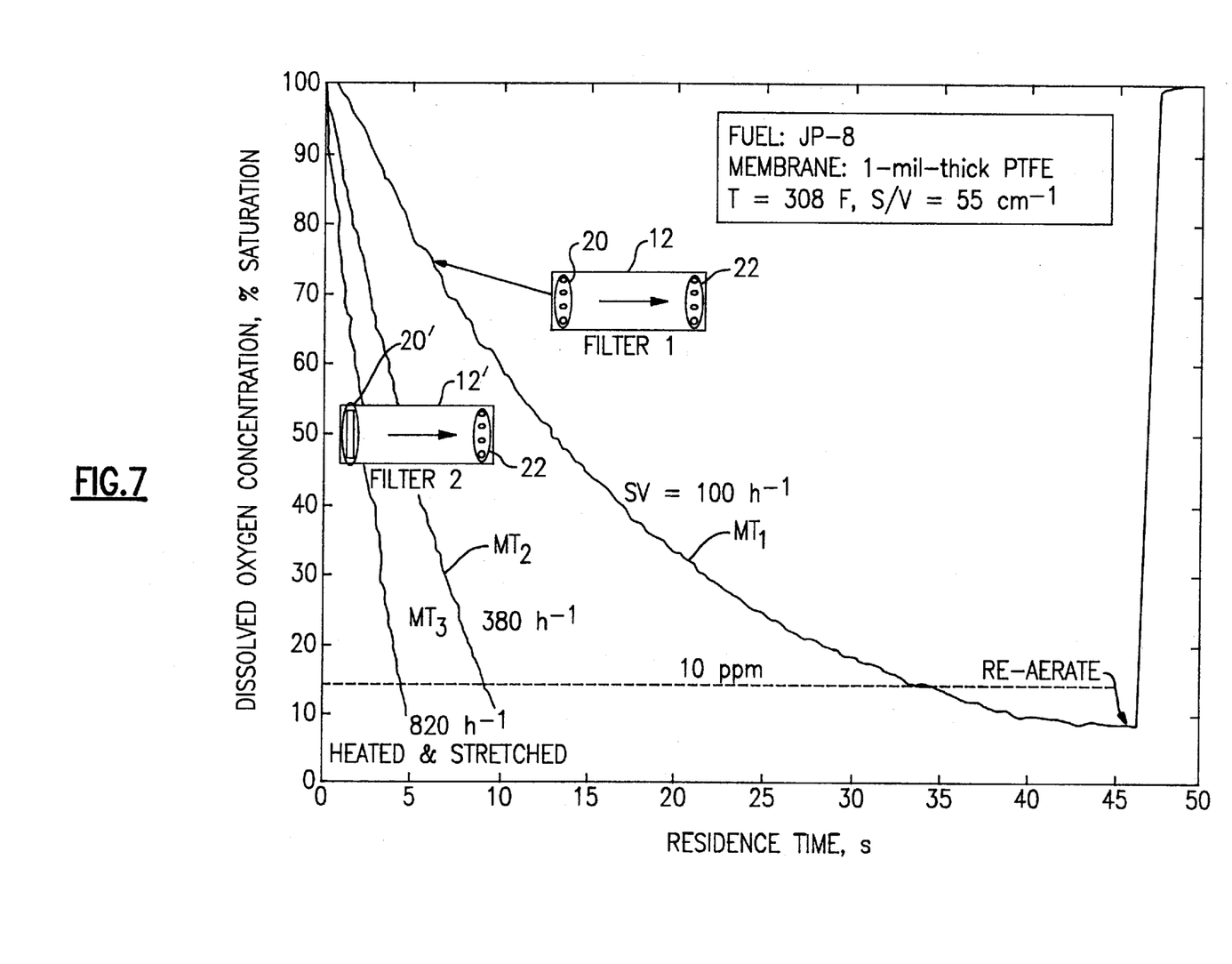
FIG. 7 graphically depicts a mass transfer enhancement effect, resulting from increased fuel turbulence, on the rate of fuel deoxygenation for the membrane material of FIG. 5.

The benefits of mass transfer enhancement are depicted in FIG. 7, in which the tests were conducted at a fuel temperature of 308° F., using a PTFE membrane of 1-mil-thickness. A first membrane filter 12 is symbolically depicted as having a few large openings as defining the fuel inlet 20, and similarly the fuel outlet 22. This results in a somewhat laminar flow of fuel 30 over the membrane 12, thereby limiting mass transfer. The result is depicted in trace MT$_1$, which requires about 33 seconds to deoxygenate to the 10 ppm level, and in turn corresponds to a space velocity of approximately 100 h$^{-1}$. A second membrane filter 12' is depicted as having a fuel inlet 20' which is modified to increase the turbulence of the fuel passing over the membrane. The inlet 20' may include a porous sintered metal member through which the fuel passes and is agitated or mixed to increase turbulence and mass transfer. The result is depicted in trace MT$_2$, which deoxygenates to the 10 ppm level in about 9 seconds, which corresponds to a space velocity of 380 h$^{-1}$. A third trace MT$_3$ represents use of the membrane filter 12' with modified fuel inlet 20', but in which that membrane has been made even thinner than 1-mil by heating and stretching it. In that instance, trace MT$_3$ indicates a rapid deoxygenation to 10 ppm in about 4 seconds, which corresponds with a space velocity of 820 h$^{-1}$.

Figure 8:
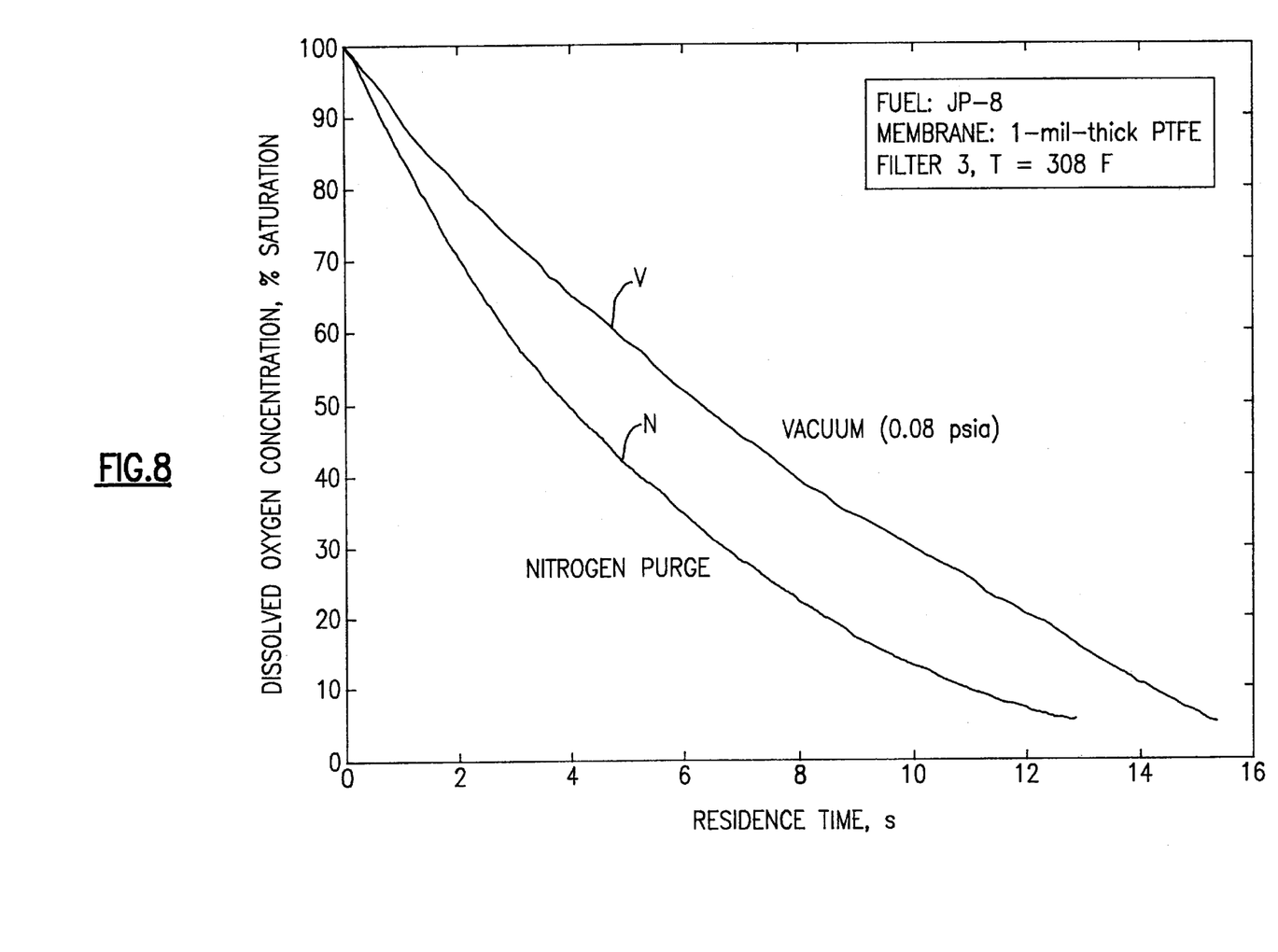
FIG. 8 graphically depicts the relative effects of a vacuum and a nitrogen purge on the rate of fuel deoxygenation when applied to the side of the membrane filter opposite the side receiving the fuel.

FIG. 8 illustrates the relative effects of using a nitrogen purge, represented by trace N, vs. a vacuum (0.08 psia), represented by trace V, applied to the removed oxygen region 18 to reduce the partial pressure of oxygen on that side of the membrane 12 relative to its partial pressure on the opposite side. This has the effect of increasing the difference in oxygen partial pressures across the membrane 12, which enhances the rate of transfer of oxygen from the fuel to, and through, the membrane 12. Trace V shows deoxygenation to the 10 ppm (14%) level in about 13 seconds, with the nitrogen purge trace N revealing a similar performance of about 10 seconds.

Figure 9:
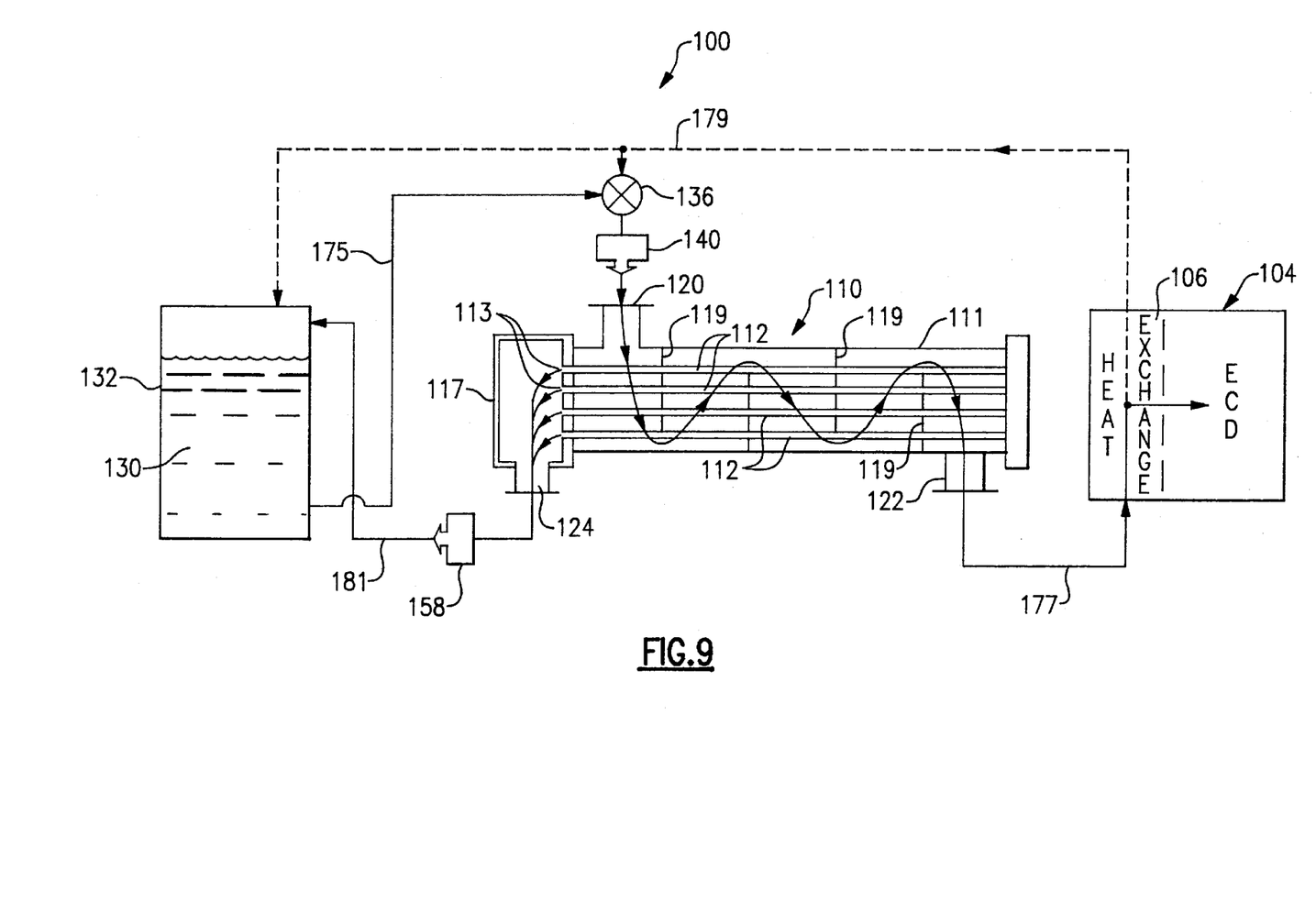
FIG. 9 is a simplified schematic block diagram of an energy conversion device (ECD) and an associated fuel system employing a fuel deoxygenator in accordance with the invention.

Although the actual embodiments of the deoxygenator of the invention may vary depending upon a number of factors including intended use and economics, a representative embodiment is illustrated in FIG. 9. A fuel supply system 100 for an energy conversion device (ECD) 104 includes a deoxygenator 110 that receives liquid fuel 130 from a reservoir 132. The fuel 130 is typically a hydrocarbon. The ECD 104 may exist in a variety of forms in which the fuel, at some point prior to eventual use for processing, for combustion or for some form of energy release, acquires sufficient heat to support autoxidation reactions and coking if dissolved oxygen is present to any significant extent in the fuel.

A likely form of ECD 104 is the gas turbine engine, and particularly such engines in high performance aircraft. Typically, the fuel serves as a coolant for one or more sub-systems in the aircraft, and in any event becomes heated as it is delivered to fuel injectors immediately prior to combustion.

In FIG. 9 there is illustrated a heat exchange section 106, to represent the one or several regions of operation through which the fuel passes in a heat exchange relationship. The heat exchange section(s) may be directly associated with the ECD 104 (as shown), and/or distributed elsewhere in the larger system.

The illustrated deoxygenator 110 is of the tube and shell type, with the shell being designated 111 and the tubes being designated 113. Generally speaking, the fuel 130 may pass either inside or outside the tubes 113, with the removed oxygen occurring in the other of the two. This requires the membrane filter 112 to at least be in direct contact with the fuel 130. In the illustrated embodiment, the fuel 130 flows into the shell region via fuel inlet 120 and over the membrane filter 112 on the exterior surface of the tubes 113. Correspondingly, the oxygen removed from the fuel occurs and collects within the tubes 113, which in turn connect to a manifold 117 containing the removed oxygen outlet 124. This construction maximizes the area of membrane filter 112 contacted by fuel 130 and minimizes the volume of shell 111, particularly with the inclusion of flow baffles 119 in the shell 111 to cause the fuel to follow a lengthy, tortuous path over the membrane filter 112 to the fuel outlet 122.

Depending upon the requirements of the deoxygenator 110, the tubes 113 may be constructed either entirely of the material forming the membrane filter 112 or they may comprise a micro-porous structural substrate having a thin exterior layer or coating of the membrane filter material as shown in FIG. 4. If the tubes 113 include a structural substrate, they may conveniently be porous sintered steel or other similar suitable material.

The membrane filter material is preferably PTFE having a thickness of 2 mils or less, and preferably 1 mil or less. The PTFE is available from various sources, including E. I. DuPont de Nemours of Delaware under the registered trademark "Teflon". The PTFE may be overlaid on the substrate of tubes 113 by one of several known techniques.

As generally understood from the discussion of the test system of FIG. 3, fuel 130 stored in reservoir 132 normally contains dissolved oxygen, possibly at a saturation level of 70 ppm. The fuel 130 is drawn from reservoir 132, typically by a pump 140, and is connected via conduit 175 and valve 136 to the fuel inlet 120 of deoxygenator 110. The pressure applied by pump 140 aids in circulating the fuel 130 through the deoxygenator 110 and other portions of the system. As the fuel 130 passes over the surface of membrane filter(s) 112, the oxygen is selectively removed into and through the membrane 112 and into the interior of tubes 113. The deoxygenated fuel flows from the fuel outlet 122, via conduit 177, to heat exchange sub-systems 106, and to the ECD 104, such as the injectors of a gas turbine engine. A portion of the deoxygenated fuel may be recirculated, as represented in broken line, by conduit 179 to either the deoxygenator or, more likely, the reservoir 132. Any fuel leakage through the membrane filter 112 and the removed oxygen within the tubes 113 are evacuated from the deoxygenator 110, by means such as a vacuum or aspirating pump 158, via oxygen outlet 124 and conduit 181 connected to the reservoir 132. This controlled removal of any fuel leakage prevents it from entering the environment and possibly posing a safety risk.

As discussed with respect to FIG. 8, control of the oxygen partial pressures on opposite sides of the membrane filter 112 can beneficially affect the rates of deoxygenation and thus, space velocities, SV. The use of a relatively reduced pressure (partial vacuum) on the removed oxygen side aids this parameter, as does an elevation of fuel temperature to about 200–250° F. on the fuel side. The latter serves to relatively increase the oxygen partial pressure by thermally liberating oxygen. An increase in the pressure of the oxygenated fuel will not have a significant benefit because it won't significantly change the oxygen partial pressure difference across the membrane or increase the membrane's permeability. Importantly, care must be taken to not increase the pressure to a level that either damages the membrane filter 112 and/or tubes 113 or forces the fuel through the membrane. In lieu of reducing the oxygen partial pressure by removing oxygen with a vacuum pump, it is also possible to displace and remove oxygen using a nitrogen purge and accomplish the same result.

Although the invention has been described and illustrated with respect to the exemplary embodiments thereof, it should be understood by those skilled in the art that the foregoing and various other changes, omissions and additions may be made without departing from the spirit and scope of the invention.

What is claimed is:

1. A method for removing dissolved oxygen from a liquid fuel in the fuel system of an energy conversion device, comprising the steps of:

(a) disposing a selected filter membrane in a deoxygenation chamber in the fuel system to divide the chamber into a fuel region and a removed oxygen region on opposite sides of the membrane filter;

(b) flowing fuel into the fuel region of the deoxygenation chamber and into contact with a fuel-side surface of the filter; and (c) controlling the difference of partial pressures of oxygen across the membrane, thereby to regulate the driving force for moving oxygen through the membrane exclusive of the fuel to deoxygenate the fuel.

2. The method of claim 1 comprising the steps of:

(a) substantially continuously flowing fuel into contact with the filter membrane to substantially continuously deoxygenate the fuel;

(b) substantially continuously removing deoxygenated fuel from the fuel region of the deoxygenation chamber; and (c) substantially continuously removing oxygen from the removed oxygen region of the deoxygenation chamber.

3. A fuel deoxygenator for removing dissolved oxygen from a liquid fuel in the fuel system of an energy conversion device, comprising a membrane filter disposed in the fuel system and positioned for liquid fuel to flow into contact with a fuel-side surface of the filter, the membrane filter being capable of removing oxygen from the fuel to a level at least below that at which significant coking occurs.

4. The deoxygenator of claim 3 wherein the membrane filter passes oxygen molecules and excludes the liquid fuel sufficiently to remove oxygen from the fuel to a level at least below about 20 ppm.

5. The deoxygenator of claim 4 wherein the membrane filter removes oxygen from the fuel to a level below about 10 ppm.

6. The deoxygenator of claim 5 wherein the membrane filter removes oxygen from the fuel to a level of about 5 ppm.

7. The deoxygenator of claim 5 wherein the membrane filter reduces the dissolved oxygen concentration in the fuel from saturation to less than about 10 ppm in a single pass of the fuel over the filter at a liquid space velocity of at least 100 $h^{-1}$.

8. The deoxygenator of claim 3 wherein the membrane filter is from the family of polytetraflouroethylene compounds.

9. The deoxygenator of claim 8 wherein the membrane filter reduces the dissolved oxygen concentration in fuel from saturation to less than about 10 ppm in a single pass of the fuel over the filter at a liquid space velocity of at least 100$h^{-1}$.

10. The deoxygenator of claim 8 wherein the membrane filter is disposed on the surface of a porous substrate.

11. The deoxygenator of claim 8 wherein the thickness of the polytetraflouroethylene membrane is less than about 0.002 inch.

12. The deoxygenator of claim 3 wherein the membrane filter is a permeable membrane which operates by a solution-diffusion mechanism.

13. The deoxygenator of claim 12 wherein the membrane filter comprises a silicone-rubber permeable membrane.

14. The deoxygenator of claim 12 wherein the membrane filter is disposed on the surface of a porous substrate.

15. The deoxygenator of claim 3 wherein the membrane filter is a porous membrane that operates by allowing dissolved oxygen to diffuse through angstrom-size pores.

16. The deoxygenator of claim 15 wherein the membrane filter comprises a layer of zeolite particles.

17. The deoxygenator of claim 16 wherein the membrane filter is disposed on the surface of a porous substrate.

18. The deoxygenator of claim 3 wherein the fuel system includes a deoxygenation chamber containing the membrane filter, the membrane filter being structured and positioned in the deoxygenation chamber to provide a fuel region and a removed oxygen region respectively on opposite sides of the membrane filter.

19. The deoxygenator of claim 18 including means for controlling the difference of partial pressures of oxygen across the membrane, thereby to regulate the driving force for moving oxygen through the membrane.

20. The deoxygenator of claim 19 wherein said means for controlling the difference of partial pressures of oxygen comprise at least one of a means for regulating the temperature of the fuel in the fuel region of the deoxygenation chamber and a means for regulating the partial pressure of oxygen in the removed oxygen region of the deoxygenation chamber.

21. The deoxygenator of claim 18 wherein the fuel system includes a fuel storage reservoir, and further including conduit means operatively connected between the removed oxygen region of the deoxygenation chamber and the fuel storage reservoir for returning removed oxygen to the fuel storage reservoir.

22. The deoxygenator of claim 3 wherein the energy conversion device is an aircraft gas turbine engine and the fuel is a hydrocarbon.

* * * * *